United States Patent [19]

Pischinger et al.

[11] Patent Number: 4,918,982
[45] Date of Patent: Apr. 24, 1990

[54] DEVICE FOR MEASURING AND TRANSMITTING THE COMBUSTION RADIATION IN THE COMBUSTION CHAMBER OF COMBUSTION ENGINES

[75] Inventors: Franz Pischinger, Aachen; Ulrich Spicher, Stolberg; Georg Heuser, Aachen, all of Fed. Rep. of Germany

[73] Assignee: FEV Motorentechnik GmbH & Co. KG, Aachen, Fed. Rep. of Germany

[21] Appl. No.: 299,443

[22] Filed: Jan. 23, 1989

[30] Foreign Application Priority Data

Jan. 23, 1988 [DE] Fed. Rep. of Germany ....... 3801949

[51] Int. Cl.⁵ ............................................. G01M 15/00
[52] U.S. Cl. ............................................. 73/116
[58] Field of Search ................... 73/116, 117.2, 117.3, 73/35, 119 R, 119 A; 356/72, 73, 375, 376, 379, 427, 437; 250/554; 374/124, 137, 45, 208

[56] References Cited

U.S. PATENT DOCUMENTS 4,397,283 8/1983 Komaroff et al. ...................... 73/35

FOREIGN PATENT DOCUMENTS 0229399 12/1986 European Pat. Off. .
3023471 6/1980 Fed. Rep. of Germany .
0057137 4/1984 Japan ................................. 73/119 R

OTHER PUBLICATIONS

SAE Technical Paper Series, Nov. 2-5, 1987.

Primary Examiner—Robert R. Raevis
Attorney, Agent, or Firm—Watson, COle, Gindle & Watson

[57] ABSTRACT

In a device for measuring and transmitting the combustion radiation in the combustion chamber of combustion engines, the combustion radiation in the movable part of the combustion engine is detected by means of optical sensors arranged therein and transmited through optical light guides to the fixed part of the engine. At the gap between the movable part and the fixed part an optical light guide emitting with its cross-section representative signals for the determined combustion radiation is arranged in the movable part, and on the fixed part opposite the gap an optical receiver is mounted for receiving and transmitting the received signals.

6 Claims, 5 Drawing Sheets

DEVICE FOR MEASURING AND TRANSMITTING THE COMBUSTION RADIATION IN THE COMBUSTION CHAMBER OF COMBUSTION ENGINES

BACKGROUND OF THE INVENTION

This invention relates to a device for measuring and transmitting the combustion radiation in the combustion chamber of combustion engines in which the combustion radiation occuring in the combustion chamber is sensed in the movable part of the combustion engine by optical sensors and is transmitted through optical light guides to the fixed part of the engine.

In research and development work in the area of combustion engines the flame propagation and the flow conditions in the combustion chamber are experimentally determined in order to obtain information on the cooperation of flame propagation, flow movement and engine parameters. For determining the flame propagation, the optical light guide measuring technique is often used, while the flow motion is in most cases determined with the aid of laser Doppler anemometry.

The light signals of the flame, received by optical probes, are transmitted by optical light guides to photomultipliers, converted into digital electrical signals and evaluated as logical signals by means of a computer program. The result is the spacial contour of the flame front in dependence on time. It is necessary to determine the light emission above the cylinder wall as well as through pistons and cylinder head.

Here the problem occurs of arranging optical measuring areas for determining the flame propagation also in the movable part of the engine, which usually is the piston, and to transmit the flame signals to the non-movable part of the engine for transmission and evaluation.

It is known from SAE paper 872060 entitled "An Experimental Study of Combustion and Fluid Flow in Diesel Engines" of Nov. 2, 1987, to perform this transmission by means of optical fibers which transmits the flame signals registered in the piston to the photomultipliers located outside the crank case. The optical fibers extend from the measuring points in the piston through or along the connecting rod and lead from there via a coupling linked to the connecting rod and an oscillating crank to the photomultipliers outside the crank case. The oscillating coupling system is designed such that the optical fibers are not overtaxed by the alternating charge. For this purpose the optical fibers are led via straps or through the joint bolts past the respective joints. With the use of fiberglass rods which have been adapted to the respective geometry of the piston by means of heat treatment, the light signals are transmitted from the piston head to the flexible optical fibers.

Such an arrangement has the advantage of an optically impeccable and relatively reliable transmission of the flame signals, but is by nature expensive to construct and has a limited durability due to the high alternating charge with higher number of revolutions under elevated temperatures. It is also not suitable for operational use in the motor vehicle.

From DE No. 30 23 471 A1 it is known to convert in an electro-optical transmitter the electrical signals into light signals, to transmit these light signals between mutually movable parts and then to reconvert the light signal back to electrical signals in an opto-electrical converter. In this manner it is possible to eliminate the disadvantages caused by friction and wear in slip ring transmission. However, such an arrangement only permits the transmission with parts which are continuously on a common rotation axis, but no transmission with parts that move against each other in a translatory manner or otherwise.

In EP No. 0 229 399 A2 a device for the wireless transmission of signals from a rotating body, particularly from the clamping chuck of drills, is disclosed. Here too, only light signals of the visible or infrared radiation are produced for the transmission of electrical signals. For application to combustion engines it is possible, if at all, only to expect overall statements regarding gas forces and oscillation. More detailed conclusions regarding the course of the combustion and thus the actual combustion process, as well as the type of flame propagation, are not possible.

SUMMARY OF INVENTION

The invention is based on solving the problem to provide a device of the aforedescribed type which makes possible the safely operated and for analysis of the combustion process usable transmission of the combustion radiation without the need for mechanically highly stressed parts which, especially at high temperatures and rotation speeds, are subject to wear and can fail. The device according to the invention for measuring and transmitting combustion radiation occuring in the combustion chamber of a combustion engine includes, in the gap between the movable part and the fixed part of the engine, an optical light guide emitting with its cross-section representative signals for the determined combustion radiation, and on the fixed part opposite the gap an optical receiver is mounted for receiving and transmitting the received signals.

It is preferred that the cross-section of the optical receiver is greater than that of the optical light guide in the movable part, and particular advantages can be attained when the observation field of the optical receiver is enlarged such that the radiation field of the optical light guide located opposite thereof extends over a given distance in the direction of the relatively movable parts. The dimension of the enlarged observation field in the direction of the relative motion of the parts can be a multiple of the dimension of the enlarged observation field transverse such direction.

According to a preferred application of the device for a piston combustion engine, the optical light guide emitting the radiation is arranged in the sidewall of the piston facing the cylinder running surface and the optical receiver is arranged in the cylinder running surface. It may be advantageous that for the piston head of a combustion engine constructed of two parts joined together along a transverse mating surface, the optical light guide that emits the determined electromagnetic radiation is arranged between the parts at such mating surface.

DETAILED DESCRIPTION OF THE INVENTION

Figure 1:
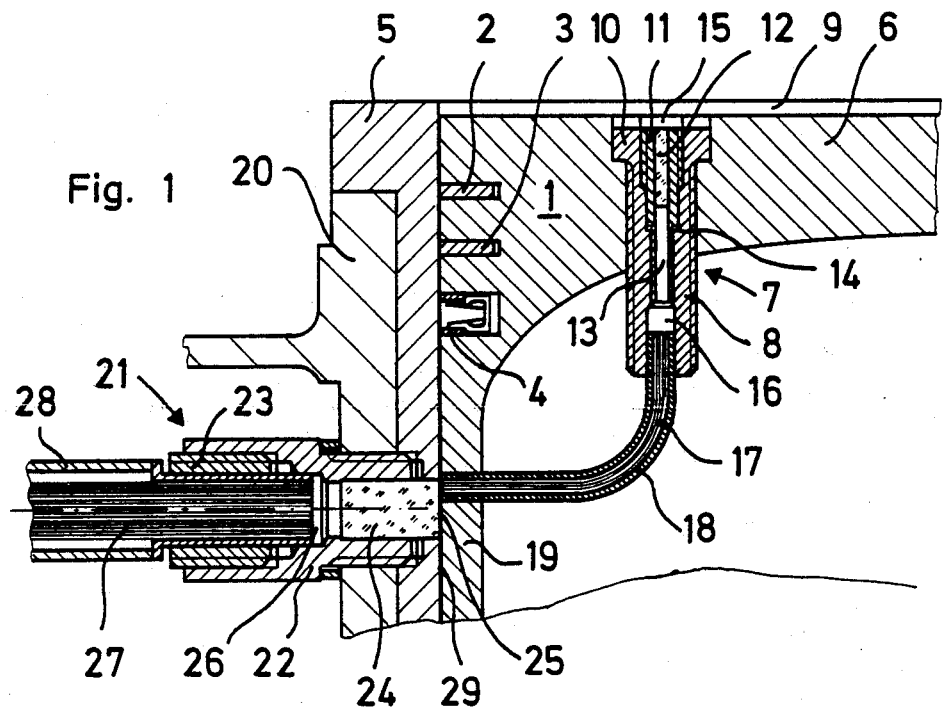
FIG. 1 is a longitudinal sectional view of a part of a piston-cylinder arrangement of a combustion engine which includes the device according to the invention.

In FIG. 1 a piston 1 with piston rings 2 and 3 and oil stripping ring 4 of a combustion engine is shown, the piston reciprocating within a cylinder 5 in the usual manner. Mounted in the head 6 of the piston 1 is a piston probe 7 comprising a sleeve 8 forming an outer probe having a radially protruding annular flange 10 on its end facing combustion chamber 9 and being threaded or glued into the piston head 6.

Another sleeve 11 is threaded or glued into sleeve 8, and a rod 12 is fixedly mounted within the inner bore of sleeve 11. Rod 12, which may be of sapphire or quartz, protects the adjoining inner passage 13 of sleeve 11 from the intrusion of combustion gases, fuel, oil, soot or the like. Sleeve 11 is sealed relative to sleeve 8 by a seal 14, preferably of copper.

The sapphire or quartz rod 12 functions, apart from sealing the inner space 13 of sleeve 11, to protect optical light guide 17 against the relatively high temperatures of an average of 300 degrees C of the piston head surface, and to facilitate cleaning of the surface 15 of the observation window formed by the rod 12 facing the combustion chamber 9.

Adjoining the inner space 13, which can be empty or filled with optically suitable material such as sapphire or quartz, is the optical light guide 17 which is mounted at its end in tube 16 and fixed to sleeve 8. The optical light guide 17 is designed as a known type of bundled optical fiber elements and is provided with a sheathing 18 for protection against oil and heat. The sheathing 18 can be of metal or of a heat-resistant synthetic material.

The end of the optical light guide 17 is arranged, relative to surface 15 of the observation window, at a sufficient distance in order to attain a small observation angle of 2 to 16 degrees for analysis of the combustion process through the observation window, preferably 6 to 8 degrees.

The optical light guide 17 with its sheathing 18 extends at its opposite end through a suitable bore in the piston wall 19 such that the free end thereof is essentially in the plane of the outer surface of the piston 1. With this arrangement protection of the optical light guide by means of a sapphire or quartz rod is generally not needed as the temperatures to which the piston wall is exposed averages only about 150 degrees C. However, should it be necessary for operational, measuring-technological or other reasons, the optical light guide 17 may be mounted in the piston wall 19 by means of a protection probe such as probe 7.

A cylinder probe 21, comprising an optical receiver, is mounted in the wall of cylinder 5 via a mounting plate 20. Similar to the piston probe 7, the cylinder probe 21 has a sleeve 22 comprising a sleeve 23 comprising the optical light guides. A sapphire rod 24, glued or otherwise secured into the sleeve 22, is arranged such that its outer end surface 25 lies in the inner wall of cylinder 5, and its opposite end surface 26 faces the end of an optical light guide cable 27. Similar to the optical light guide 17, the optical light guide cable 27 comprises a bundle of optical light guide elements provided with a protective sheathing 28. Optical receiver 21 is thus located opposite optical light guide 17 at the gap 29 formed between the piston side wall and the cylinder bore. The optical light guide cable 27 transmits the information received from the optical light guide 17 for processing, for example, to a photomultiplier. The information is then converted into digital electrical signals and is evaluated as logic signals by means of a computer program, in the well known manner.

Figure 3:
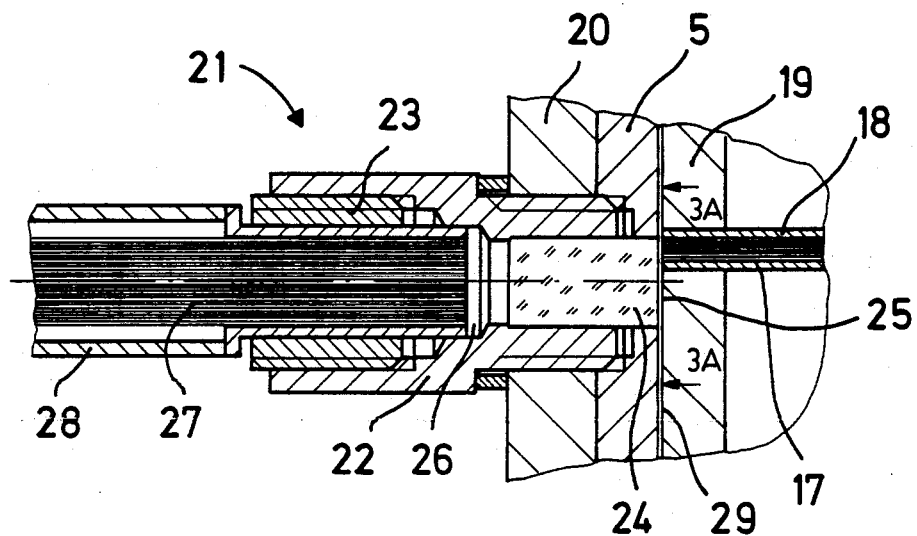
Figure 3A:
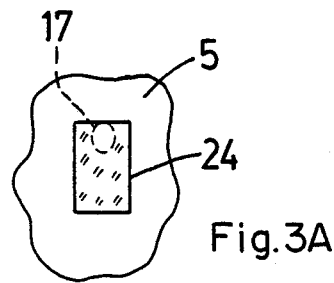
FIG. 3A is a view taken substantially along the line 3A—3A of FIG. 3.

As shown in FIG. 3A, the observation field presented by rod 24 has a dimension in the direction of piston reciprocation which is greater than its dimension perpendicular to such direction, i.e., may be of rectangular shape as shown or of oval shape. Optical light guide 17 is illustrated in phantom outline in FIG. 3A to show its position relative to the observation field.

Figure 2:
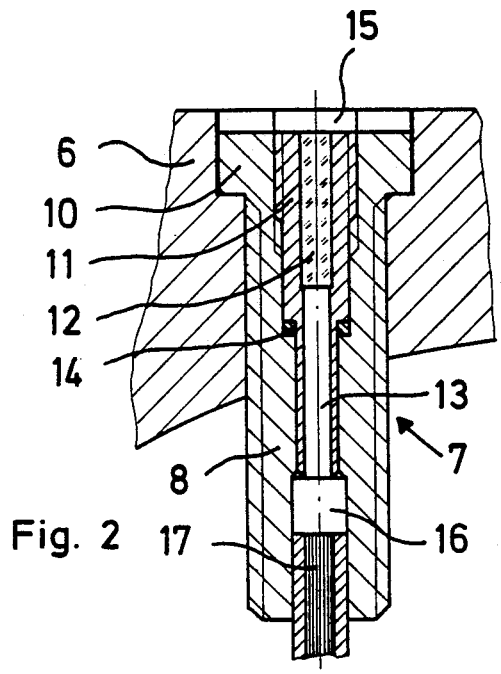
FIGS. 2 and 3 are views similar to FIG. 1 of enlarged portions thereof.
Figure 4:
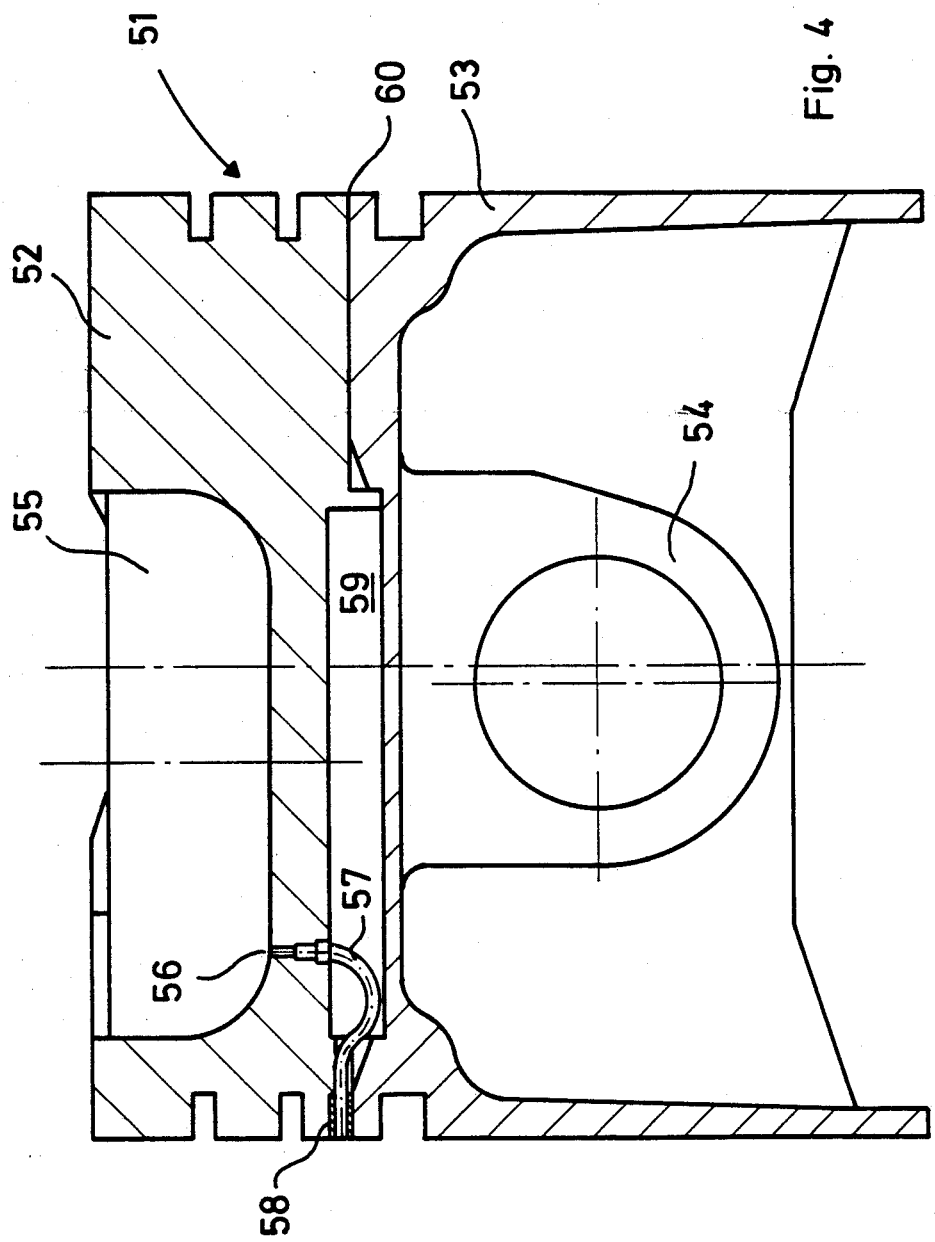
FIG. 4 is a longitudinal sectional view of a multi-part piston of a combustion engine in which the combustion chamber is observed via a probe in the piston through according to the invention.

In FIG. 4 the piston 51 comprises a head part 52 and a shaft part 53 having a piston pin boss 54. Part 52 has a piston trough 55, and a measuring probe 56 for observing the combustion process faces into the trough. The measuring probe 56, which can be constructed similarly as piston probe 7 (FIGS. 1 and 2), is connected through an optical light guide cable 57 to a transmitter probe 58 which can be similarly constructed as shown in FIG. 1 in the area of the piston wall 19, or which may be similarly constructed as the cylinder probe 21 (FIGS. 1 and 3). The optical light guide cable 57 is led through the space 59 between the head part 52 and the shaft part 53 (joined together in some suitable manner) and then extends along the transverse mating surface 60 between the head part 52 and shaft part 53. The transmitter probe 58 is also located at this surface 60. This manner of construction offers considerable advantages regarding the mounting and maintenance of the device.

Figure 5:
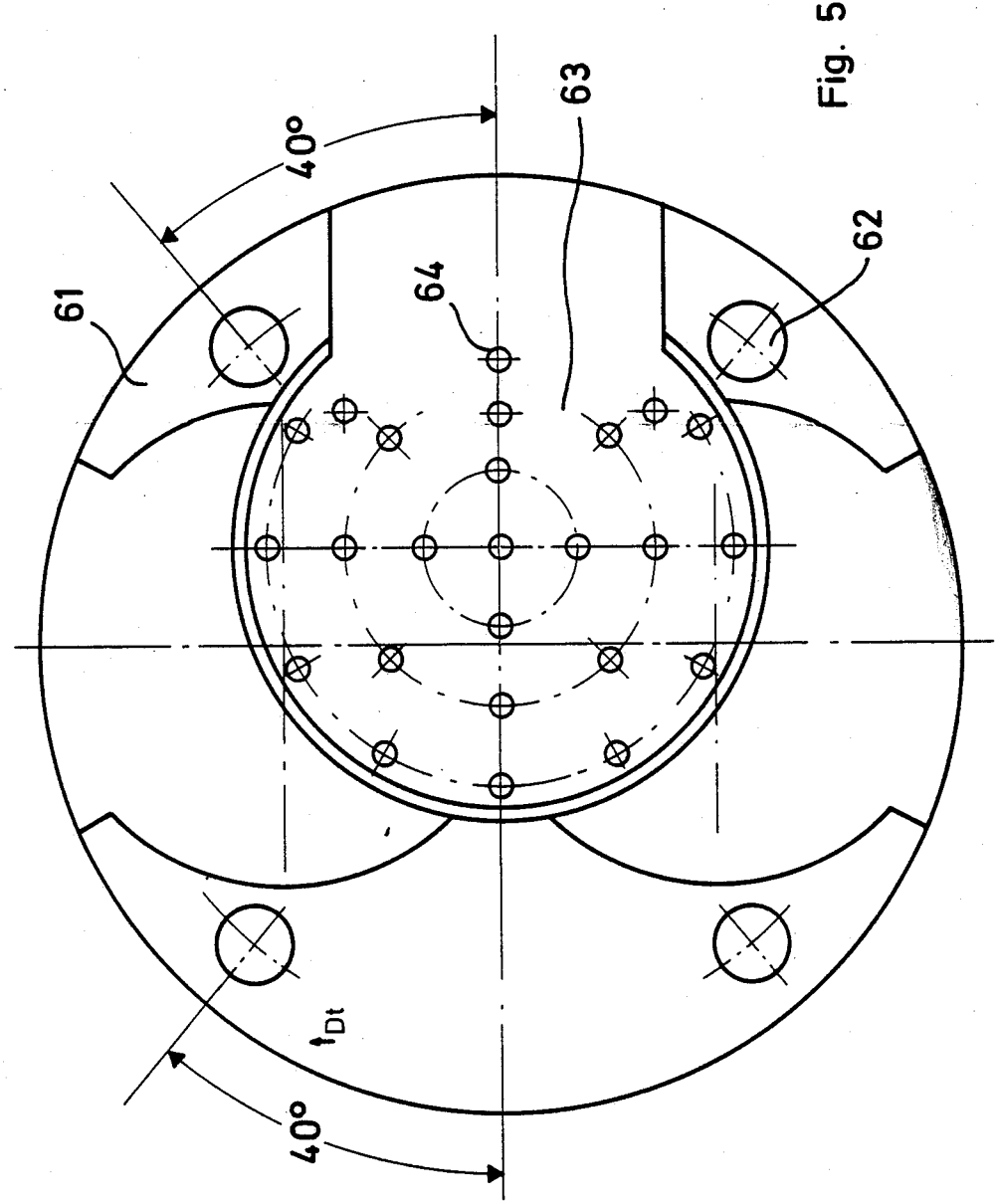
FIG. 5 is a top plan view of a piston head illustrating the distribution of probes across the piston surface according to the invention. And, FIG. 6 is a longitudinal sectional view of the sensor arrangement of a crank case relative to a piston constructed according to FIG. 4.

FIG. 5 is a top view of a piston head 61 which can be constructed in a similar manner as the head part 52 (FIG. 4). For connecting to the shaft part (not shown) there are four bores 62 for screw bolts (not shown). In order to make possible a sufficiently detailed observation of the combustion process, a total of twenty-five probes 64 are, for example, distributed across the piston trough 63, the measuring results of which can be transmitted in the aforedescribed manner to the stationary part of the combustion engine.

Figure 6:
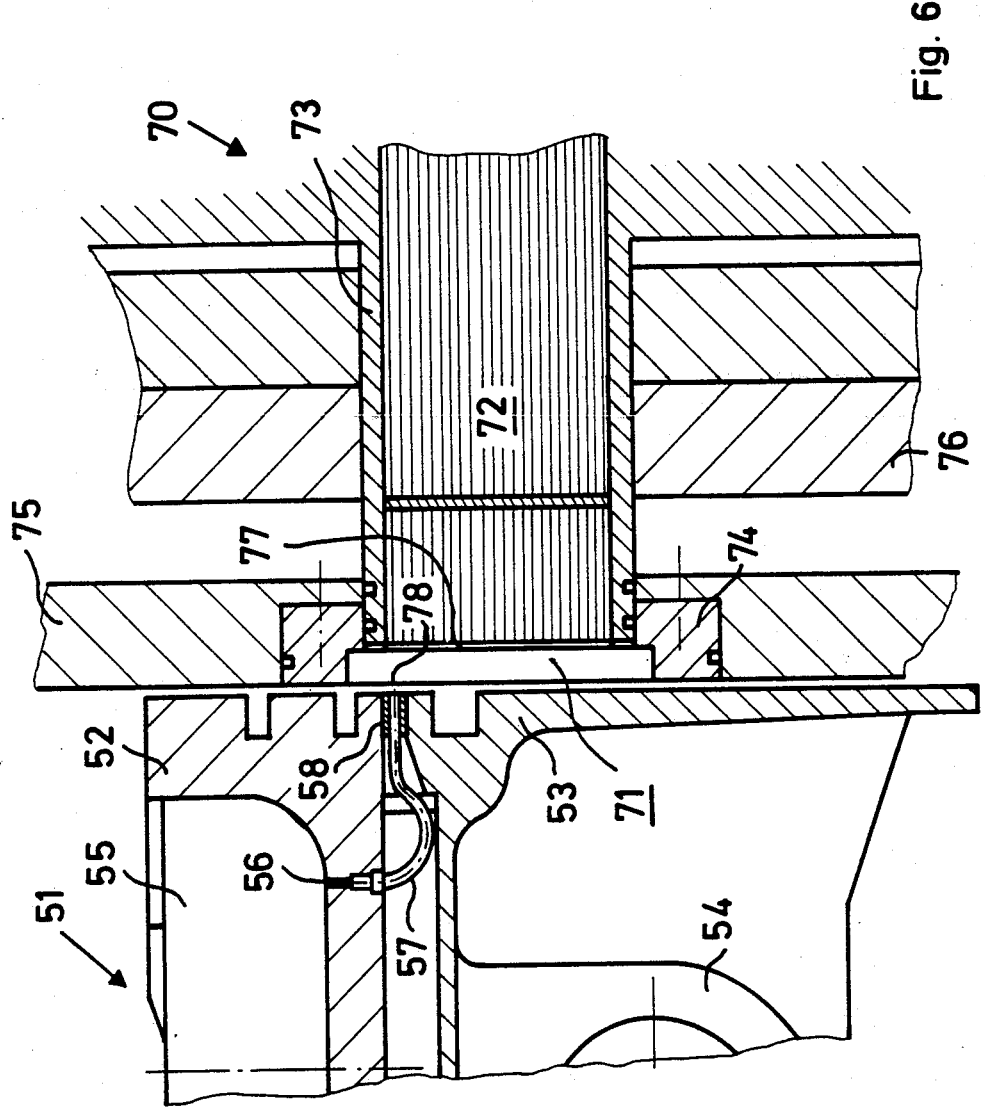

Shown in FIG. 6 is the cooperation between a probe 70 in the cylinder liner and a piston probe, which can be constructed similarly to the transmitter probe 58 (FIG. 4).

Located opposite the transmitter probe 58 is a disc 71, which can be of the same material as the sapphire rod 24 (FIGS. 1 and 3) and which serves as a continuation of an optical light guide cable 72, corresponding to the optical light guide cable 27 in FIGS. 1 and 3. The optical light guide cable 72 is surrounded by a suitable sheathing 73 which, together with cable 72, extend through intermediate plate 74, cylinder liner 75 and crank case 76.

It can be seen that the observation field 77 of the disc-light guide arrangement 71, 72 is considerably greater than the radiation field 78 of the transmitter probe 58 arranged in piston 51. By this measure a substantial simplification of the overall arrangement is achieved without reducing versatility. It is also possible to attain advantages when, in reverse, the radiation field of the transmitter probe arranged in the piston is greater than the observation field of the probe arranged in the cylinder tube. The radiation or the observation field of one of the optical light guides can be enlarged in such a manner that the radiation or the observation field of the other optical light guide is located opposite it over a predetermined distance of the relative motion of the two parts. It can also be advantageous that the dimension of the enlarged radiation or observation surface in the direction of the relative motion of the two parts is a multiple of the dimension transverse thereto and has, for example, a rectangular or elliptical shape.

What is claimed is:

1. A device for measuring and transmitting combustion radiation occurring in the combustion chamber of a combustion engine having a fixed part and at least one part moveable relative to the fixed part for together defining the combustion chamber, said parts having confronting relatively slideable surfaces defining a gap therebetween, the device comprising at least one optical sensor mounted in said movable part and facing said chamber, an optical light guide extending from said sensor and terminating at said gap, said light guide having a surface area at said gap for emitting signals from said chamber representing the combustion radiation, and an optical receiver mounted in said fixed part and terminating at said gap opposite said optical light guide for receiving and transmitting said signals.

2. The device according to claim 1, wherein said optical receiver has a surface area opposite said gap greater than the surface area of said optical light guide.

3. The device according to claim 2, wherein said optical receiver comprises an enlarged observation field, and said optical light guide comprises a relatively smaller radiation field located opposite said enlarged observation field.

4. The device according to claim 3, wherein the dimension of the enlarged observation field in a direction of the relative movement of said parts is greater than the dimension perpendicular to said direction.

5. The device as in any one of the preceding claims, wherein said engine comprises a piston combustion engine, said movable part comprises a piston and said fixed part comprises a cylinder in which said piston reciprocates, said optical light guide terminating in the side wall outer surface of said piston, and said optical receiver terminating in the inner wall surface of said cylinder.

6. The device according to claim 5, wherein said piston comprising two parts joined together along a transverse mating surface, said optical light guide being mounted between said parts at said mating surface.

* * * * *